United States Patent [19]

Babayan

[11] 3,948,829

[45] Apr. 6, 1976

[54] STRIPPABLE, THIN, PROTECTIVE COATING
[75] Inventor: Eduard P. Babayan, Huntington Beach, Calif.
[73] Assignee: Hitco, Irvine, Calif.
[22] Filed: Apr. 5, 1973
[21] Appl. No.: 348,132

[52] U.S. Cl. .................. 260/18 TN; 260/77.5 AM; 260/77.5 CR; 260/77.5 AT; 260/77.5 SS
[51] Int. Cl.² ........................................ C08G 18/32
[58] Field of Search ............ 260/77.5 AM, 77.5 CR, 77.5 AT, 260/77.5 SS, 18 TN

[56] References Cited
UNITED STATES PATENTS

| | | | |
|---|---|---|---|
| 3,042,631 | 7/1962 | Strandskov | 260/77.5 SS |
| 3,404,130 | 10/1968 | Sigura et al. | 260/77.5 |
| 3,427,366 | 2/1969 | Verdol et al. | 260/859 |
| 3,431,235 | 3/1969 | Lubowitz | 260/47 |
| 3,549,569 | 12/1970 | Farah et al. | 260/77.5 AT |
| 3,632,844 | 1/1972 | Robins | 260/18 TN |

Primary Examiner—M. J. Welsh
Attorney, Agent, or Firm—Marvin E. Jacobs

[57] ABSTRACT

A coherent, adherent, thin coating for metal surfaces is disclosed. The coating comprises a polymeric composition of a high vinyl content, liquid, hydroxy-terminated butadiene prepolymer, chain extended and cured by polyisocyanates and polyamines. The coating is sprayed onto an aluminum surface and after evaporation of solvent and curing for a short period at elevated temperature exhibits an adhesion to aluminum of between 0.2 lb/in to 2 lb/in, an elongation of 75% to 150%, and a tensile strength from 1,000 to 4,000 psi. The coating is strippable when applied at 2–5 mil thickness onto aluminum, and protects the metal surface during etching in chromic acid, during high temperature bonding and during final assembly operations. The coated surfaces can be machined, riveted, drilled and stretch formed without any lifting or tearing of the coating.

11 Claims, No Drawings

STRIPPABLE, THIN, PROTECTIVE COATING

BACKGROUND OF THE INVENTION

1. Field of the Invention

The present invention relates to strippable, protective coatings and, more particularly, to such coatings capable of remaining on a metal surface without lifting or tearing during etching, forming or machining operations.

2. History of the Prior Art

During manufacturing of airframes, it is necessary to protect the surface of the airframe panels throughout processing including etching, bonding, assembling and machining operations. The present practice in the aircraft industry is to utilize two protective coatings. The first coating is applied in a 7 to 10 mil thickness to protect the surface during the etching and bonding cycle. However, this coating cannot be utilized during the assembly and machining operations due to its thickness and because it lifts or tears during bending, drilling or machining operations.

SUMMARY OF THE INVENTION

The strippable coating composition of the invention when applied to an aluminum surface at 2–5 mil thickness provides protection during etching in chromic acid, a 250°F to 350°F bonding cycle and the final assembly and machining operations due to the controlled elongation and tensile properties. The coated parts can be machined, riveted, front or back drilled and stretch formed without exhibiting any lifting from the surface or tearing of the coated film. The coated film remains sufficiently adherent to the metal base so that no leakage of processing chemical occurs between the film and the metal surface, yet the film is sufficiently cohesive, that is, has sufficiently high tensile strength so as to be manually peelable after processing is completed. The film is chemically resistant to acid, basic or salt solutions.

The coating is formed from a composition comprising a solution of a low molecular weight liquid diene, hydroxy-substituted, high vinyl content prepolymer, a diisocyanate coupling agent and a diamine curing agent. The composition may optionally include a tri- or tetrafunctional cross-linking agent and dyes, fillers and antioxidants.

Protectant films of the desired thickness, suitably as low as 2–5 and usually about 3–4 mils, can be applied by a single pass of the film forming composition onto the surface. After evaporation of solvent and curing an adherent and coherent film is formed on the surface having a tensile strength between 1,000 to 4,000 psi, an elongation of 75% to 150% and an adhesion to aluminum of between 0.2 lb/in to 2 lb/in.

These and other objects and many attendant advantages of the invention will become apparent as the description proceeds.

DESCRIPTION OF THE PREFERRED EMBODIMENTS

The liquid prepolymers employed are preferably of the diene type, for example, homo- or co-polymers of a conjugated diene containing from 4 to 12 carbon atoms per molecule and preferably 4 to 8 carbon atoms per molecule, such as 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. The conjugated diene may also contain halogen hydroxy, carboxyl or lower alkoxy substituents along the chain such as chloroprene, fluoroprene, 2-methoxy-1,3-butadiene, 2-ethoxy-3-ethyl-1,3-butadiene, and 2-ethoxy-3-methyl 1,3-hexadiene.

The vinyl co-monomer should not exceed 35% of the polymer in order to provide a polymer having tensile strength in the specified range. Suitable co-monomers are vinyl compounds such as vinyl-substituted aromatic and aliphatic compounds. Examples of co-monomers that can be employed in the film forming fluid prepolymers of the invention include acrylonitrile, methacrylonitrile, propylene, butene, isobutylene, styrene, 1-vinylnaphthalene, 2-vinylnaphthalene, and alkyl, cycloalkyl, aryl, alkaryl, aralkyl, alkoxy, aryloxy, and dialkylamino derivatives thereof.

The equivalent weight of the liquid prepolymer is at least a thousand and not usually more than five thousand. The functionality of the prepolymer is advantageously slightly over 2, but less than 5, to form by cross-linking and chain-extending finaly polymers of molecular weight of at least 20,000. With the higher molecular weight prepolymers, it may be necessary to apply heat to reduce viscosity before applying the composition to the substrate. Therefore, the equivalent weight is preferably from 1,000 to 3,000.

Reactive functionality is provided by hydroxyl groups which are positioned on terminal carbon atoms and some may be present on intermediate chain atoms or branches attached to the chain. Upon addition of polyfunctional reactive coupling agents and suitable catalysts or accelerators, the low molecular weight liquid reacts in place on the workpiece either at ambient or elevated temperature to produce a high molecular weight fully compounded polymeric maskant. The functionality is preferably maintained within the range of 2.1 to about 2.5 in order that excessive cross-linking does not transform the product into too plastic a state and thus reduce the resilient properties desirable for the intended usage.

The homopolymer or copolymeric prepolymer preferably contains a minimum amount, suitably no less than 70% of vinyl, 1,2 addition units and preferably from 75% to 90% vinyl addition to provide the desired tensile and elongation properties after cure. A suitable material, HYSTYL G-1000, has a funtionality between 2.1 to 2.5, a molecular weight of about 1500 and a minimum hydroxyl content of about 1.1 meq/gm. Though these types of materials are usually chain extended and then cured by free radical peroxide agent to form casting or molding compounds, free radical cure must be avoided in the process of the invention since the final film would be too stiff for the intended usage.

Preferably, the polyisocyanates are those represented by the general formula $R(NCO)_m$ wherein R is a polyvalent organic radical containing from 2 to 30 carbon atoms and $m$ is 2, 3 or 4. R can include aliphatic, cycloaliphatic, aromatic groups or combinations thereof. It is preferred that the organic radical be essentially hydrocarbon in character although the presence of unreactive groups containing elements other than carbon and hydrogen is permissible.

Examples of suitable compounds of this type include isophorone diisocyanate, benzene 1,3-diisocyanate, hexane 1,6-diisocyanate, tolylene 2,4-diisocyanate (TDI), tolylene 2,3-diisocyanate, diphenylmethane 4,4'-diisocyanate, naphthalene 1,5-diisocyanate, diphenyl 3,3'-dimethyl 4,4'-diisocyanate, diphenyl 3,3'-dimethoxy 4,4'-diisocyanate diethyl ether, 3(diethylamino) pentane 1,5-diisocyanate, butane 1,4-diisocyanate, cyclohex-4ene 1,2-diisocyanate, benzene 1,3,4-triisocyanate, naphthalene 1,3,5,7-tetraisocyanate, naphthalene 1,3,7-triisocyanate and toluidine diisocyanate.

Since the film forming composition is conventionally applied by spray application, in order to control curing characteristics, it has been found that the composition of the invention should further include a controlled amount of a diamine as a secondary coupling curing agent. It has been further found that aliphatic diamines have an excessive rate cure such that the sprayed composition may cure before hitting the metal surface. Aromatic diamines have also been found to have a excessive rate of cure and cure the film to an excessively hard condition.

Preferred curing agents are cycloaliphatic diamines containing at least one primary amine group attached to an alicyclic carbon atom, suitably compounds of the formula:

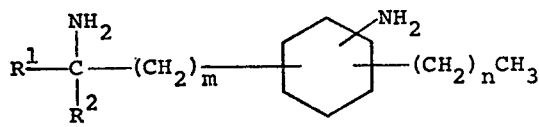

where $R^1$ and $R^2$ are lower alkyl of 1 to 10 carbon atoms and where $n$ is an integer from 0–4 and $m$ is an integer from 0–4. An exemplary cycloaliphatic diamine is methane diamine and preferably in admixture with an N-primary amino-lower alkyl substituted cyclohexylamine such as N - (3-aminopropyl) cyclohexylamine of the formula:

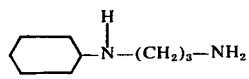

Another suitable diamine is a mixture of phenylene diamine and cumene diamine.

Generally the diisocyanate is present in a stoichiometric amount of 75 to 125% based on the functionality of the prepolymer. The diamine is generally present in an amount of 5 to 20 parts per 100 parts of resin by weight (phr). A small amount of from 1–5 phr of a tri or tetrafunctional cross-linking agent may be present.

Suitable cross-linking agents are polyols or triisocyanates such as the TDI adduct of trimethylol propane or tetra (ω-hydroxyethyl) ethylene diamine.

The polymers may be cured at temperatures from ambient to 400°F although they are preferably cured at a temperature of 200°–300°F. The time of cure can be from several minutes to several days, depending on the polymer being cured, but is preferably from 15 minutes to 2 hours. Curing can be accelerated by appropriate urethane cure catalysts such as less than 0.5 phr of dibutyl ditinlaurate or ferric acetyl acetonate.

The properties of the film may be varied within the stated ranges by the presence of 1–3 phr of low molecular weight alkanols such as butanol, pentanol or decanol or diols such as butane diol or hexane diol. The former will provide a less plastic film while the latter will provide a more crystallized, harder and tougher film. Temperature resistance of the film is improved by the addition of 1 to 3 phr of a free radical inhibitor such as hydroquinone. Since the adhesion may not be satisfactory in this case, the composition may contain 1–3 phr of a release agent such as a glycerol ester of $C_{16}$ to $C_{18}$ fatty acid. A suitable material is NEOFAT 10.

The solvents may be aliphatic aromatic, esters, ethers, ketones or clorinated derivatives thereof such as mineral spirits, chlorobenzene, toluene, amylacetate, naptha, methyl-ethyl ketone (MEK) or cyclohexanone.

Conventional additives such as fillers, dyes and antioxidants can be present in the composition. A suitable dye is Phthalo-Blue. A representative antioxidant is a hindered phenol such as 2,2'-methylenebis-(4-ethyl-6-tert. butyl phenol) or 2,2'-methylenebis-(4-methyl-6-tert. butyl phenol). Fillers can be opaque fillers such as carbon black, translucent fillers such as metal silicates or transparent fillers such as silica. The latter filler provides thin films having the best properties.

Films having the optimum properties are provided from compositions containing a hydroxy-terminated polybutadiene having a molecular weight of about 1500 and a functionality of 2–5. The optimum diisocyanate is a cycloaliphatic diisocyanate such as isophorone diisocyanate (IPDI) which is found to provide a slower, more controllable cure and is less moisture sensitive than many other disocyanates.

General and specific compositions are illustrated in the following table:

TABLE I

| PART A Part 1 Material | Parts, by weight Range | Ex. 1 | |
|---|---|---|---|
| HYSTL G-1000 | 100 | 100 | |
| IPDI | 32–42 | 40 | (5% excess) |
| Solvent (Naptha) | Balance | 60 | |
| | 200 | 200 | |
| Part 2 | | | |
| Antioxidant | 5–15 | 12 | |
| Dye | 1–3 | 1.5 | |
| Filler (Aerosil 972 silica) | 5–15 | 10 | |
| Solvent (Naptha) | Balance | 276.5 | |
| | 500 | 500 | |
| PART B | | | |
| Menthane diamine | 5–15 | 10 | |
| N-(3-aminopropyl) cyclohexylamine | 2–8 | 6 | |
| Solvent (MEK) | Balance | 134 | |
| | 150 | 150 | |

Since this composition has a short pot life of 6–20 minutes, Part A is maintained separate from Part B until just before spray application. Three parts of Part A are combined with one part of Part B by volume and were applied in a single by an airless spray unit onto an aluminum panel to form a film having a thickness of 3 mil.

After curing under ambient conditions for 15 hours, the tensile strength was 1300–1700 psi, the elongation was 100–150% and the adhesion to aluminum was 0.2 lb/in to 1 lb/in. After curing at 250°C for ½ hour the tensile strength improved to 2200 to 3800 psi and the elongation was 75 to 150%.

EXAMPLE 2

Two parts of butane diol were added to Part A of Example 1 and the IPDI level was increased to 48 phr. The toughness was increased. After ambient cure for 15 hours the tensile strength was 1500 to 2200 psi and the elongation was 75–120%. When cured at 250°C for ½ hour the tensile strength was 3000 to 4000 psi and the elongation 50%–150%.

EXAMPLE 3

A high temperature variation was synthesized by adding 1–3 parts of hydroquinone to Part B of Example 1. The film could withstand prolonged exposure to 350°C temperatures. However, the peel adhesion was increased to 1 lb/in to 2 lb/in.

EXAMPLE 4

The adhesion to aluminum of the film of Example 3 was modified by adding 1 part of Neofat 10 to Part A of the composition of Example 1. The adhesion after cure at 250°C for ½ hour was reduced to 0.2 to 0.9 lb/in.

Further examples of compositions suitable for forming films according to the invention follow:

| Example 5 | | |
|---|---|---|
| Prepolymer | | |
| Hystl G-1000 | 100 | g |
| Isophorone diisocyanage (IPDI) | 31.5 | |
| Dibutyl ditinlaurate | 0.1 | |
| MEK | 131.6 | |
| Curative | | |
| Menthane diamine | 13.2 | |
| MEK | 100 | |

A cast film of this formation after evaporation of solvents and cured for one-half hour at 250°F will yield a tensile of 2400 psi with 100% elongation.

| Example 6 | | |
|---|---|---|
| Prepolymer | | |
| Hystl G-1000 | 100 | g |
| Isophorone diisocyanate | 30.5 | |
| Odorless Mineral Spirits | 133.6 | |
| Dibutyl ditinlaurate | 0.1 | |
| Vorite 144 (TDI adduct of trimethylol propane) | 3 | |
| Curative | | |
| Menthane diamine | 7.9 | |
| N-(3-aminopropyl) Cyclohexylamine | 4.8 | |
| MEK | 100 | |

A cast film of this formulation after evaporation of solvents and cured for one-half hour at 250°F will yield a tensile strength of 2000 psi with 137% elongation.

| Example 7 | | |
|---|---|---|
| Prepolymer | | |
| Hystl G-1000 | 100 | g |
| IPDI | 31.5 | |
| Dibutyl ditinlaurate | 0.1 | |
| Odorless Mineral Spirits | 164.6 | |
| Vorite 144 | 3 | |
| Mistron Vapor | 30 | |
| Curative | | |
| Catur 7 (an eutectic mixture of m-phenylene diamine and cumene diamine) | 10.5 | |
| MEK | 100 | |

A cast film of this formulation after evaporation of solvents and cured for one-half hour at 250°F will yield a film with a tensile strength of 1200 psi and 57% elongation.

| Example 8 | | |
|---|---|---|
| Prepolymer | | |
| Hystl G-1000 | 100 | g |
| Isophorone diisocyanate | 39 | |
| Dibutyl ditinlaurate | 0.1 | |
| Odorless Mineral Spirits | 142.1 | |
| Toluene diisocyanate 80:20 | 3 | |
| Curative | | |
| Menthane diamine | 9.3 | |
| N-(3-aminopropyl) cyclohexylamine | 5.65 | |
| MEK | 100 | |

A cast film of this formulation after evaporation of solvents and cured for one-half hour at 250°F will yield a tensile strength of 2700 psi with 140% elongation.

| Example 9 | | |
|---|---|---|
| Prepolymer | | |
| Hystl G-1000 | 100 | g |
| Toluene diisocyanate 80:20 | 25 | |
| Mistron Vapor | 30 | |
| Odorless Mineral Spirits | 155 | |
| Curative | | |
| Tetra (ω-hydroxyethyl) ethylene diamine | 11.4 | |
| MEK | 100 | |
| Dibutyl diisocyanate | 0.1 | |

A cast film of this formulation after evaporation of solvents and cured for one-half hour at 250°F will yield a tensile strength of 1800 psi with 140% elongation.

| Example 10 | | |
|---|---|---|
| Prepolymer | | |
| Hystl G-1000 | 100 | g |
| Toluene diisocyanate 80:20 | 25 | |
| Mistron Vapor (silica) | 130 | |
| Odorless Mineral Spirits | 155 | |
| Curative | | |
| N-(3-aminopropyl) Cyclohexylamine | 2.5 | |
| Tetra (ω-hydroxylethyl) ethylene diamine | 9.05 | |
| Hydroquinone | 5 | |
| MEK | 100 | |

A cast film of this formulation after evaporation of solvents and cured for one-half hour at 250°F will yield a film with tensile strength of 960 psi and 127% elongation.

| Example 11 | |
|---|---|
| Prepolymer | |
| Hystl G-1000 | 100 g |
| Hexamethylene diisocyanate | 46.4 |
| Tetra (ω-hydroxyethyl) ethylene diamine | 3 |
| Odorless Mineral Spirits | 149.5 |
| Curative | |
| Menthane diamine | 9.3 |
| N-(3-aminopropyl) Cyclohexylamine | 5.65 |
| MEK | 100 |

A cast film of this formulation after evaporation of solvents and cured for one-half hour at 250°F will yield a film with a tensile strength of 2500 psi and 72% elongation.

| Example 12 | |
|---|---|
| Prepolymer | |
| Hystl G-1000 | 100 g |
| 2,2,4 (2,4,4) trimethyl hexamethylene diisocyanate | 37 |
| Tetra (ω-hydroxyethyl) ethylene diamine | 3 |
| Odorless Mineral Spirits | 140.1 |
| Dibutyl ditinlaurate | 0.1 |
| Curative | |
| Menthane diamine | 9.7 |
| N-(3-aminopropyl) Cyclohexylamine | 5.65 |
| MEK | 100 |

A cast film of this formulation after evaporation of solvents and cured for one-half hour at 250°F will yield a film with a tensile strength of 2000 psi and 200% elongation.

The ratio of elongation to tensile strength is critical. The combination of low elongation and high tensile strength is necessary for machinability. If the ratio is too high during drilling, the film will tear. If the ratio is too low during peeling, the film breaks too easily and will crack or tear during bending operations. At higher values of peel adhesion, the compositions of this invention form very satisfactory chem-mil maskants.

Coated aluminum panels were processed by bending, cutting an area, removing the area and etching the area in chromic acid. The film performed satisfactorily under all conditions. The composition is very versatile in both the variety of materials and conditions of application and cure.

It is to be understood that only preferred embodiments of the invention have been described, and that numerous substitutions, alterations, and modifications are all permissible without departing from the spirit and scope of the invention as defined in the following claims.

What is claimed is:

1. A sprayable composition for forming a coherent, adherent, strippable coating for metal surfaces which cures by condensation at 200°–300°F in the absence of free radicals to form a film exhibiting an adhesion to aluminum of between 0.2 lb/in to 2 lb/in, an elongation of 75% to 150% and a tensile strength from 1,000 to 4,000, said composition consisting essentially of a first part comprising a solvent solution of the reaction product of a high vinyl content, hydroxy substituted liquid prepolymer of a diene containing 4–12 carbon atoms having a vinyl content from 70–90%, an equivalent weight from 1,000 to 5,000 and a hydroxyl functionality of from 2–5; and 75% to 125% based on the functionality of the prepolymer of a polyisocyanate of the formula:

where R is a polyvalent hydrocarbon radical containing 2–30 carbon atoms and $m$ is an integer from 2–4; and a second separate part comprising a solvent solution of 5–20 phr of an amine curing agent mixture consisting essentially of a cycloaliphatic diamine of the formula:

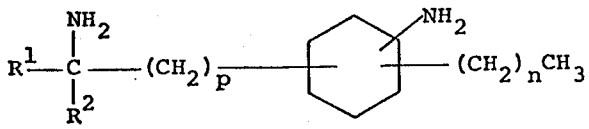

where $R^1$ and $R^2$ are lower alkyl, $p$ is an integer from 0–4 and $n$ is an integer from 0–4 and a minor amount of a N-primary amino-lower alkyl substituted cyclohexylamine.

2. A composition according to claim 1 in which the prepolymer is a polybutadiene.

3. A composition according to claim 2 in which the functionality is from 2.1 to 2.5 and the equivalent weight is from 1,000 to 3,000.

4. A composition according to claim 3 in which the vinyl content is from 75% to 90%.

5. A composition according to claim 4 further including 1–5 parts per 100 parts of prepolymer resin of cross-linking agent selected from triols and triisocyanates.

6. A composition according to claim 4 further including 1–3 phr of low molecular weight alkanols or diols.

7. A composition according to claim 4 further including 1–3 phr of a free radical inhibitor.

8. A composition according to claim 7 in which the inhibitor is hydroquinone.

9. A composition according to claim 8 further including 1–3 phr of a glycerol ester of a $C_{16}$–$C_{18}$ fatty acid.

10. A composition according to claim 1 in which the polyisocyanate is isophorone diisocyanate.

11. A composition according to claim 1 in which the diamine mixture includes at least 60% by weight of menthane diamine and the remainder is N - (3-aminopropyl) cyclohexylamine.

* * * * *